UNITED STATES PATENT OFFICE.

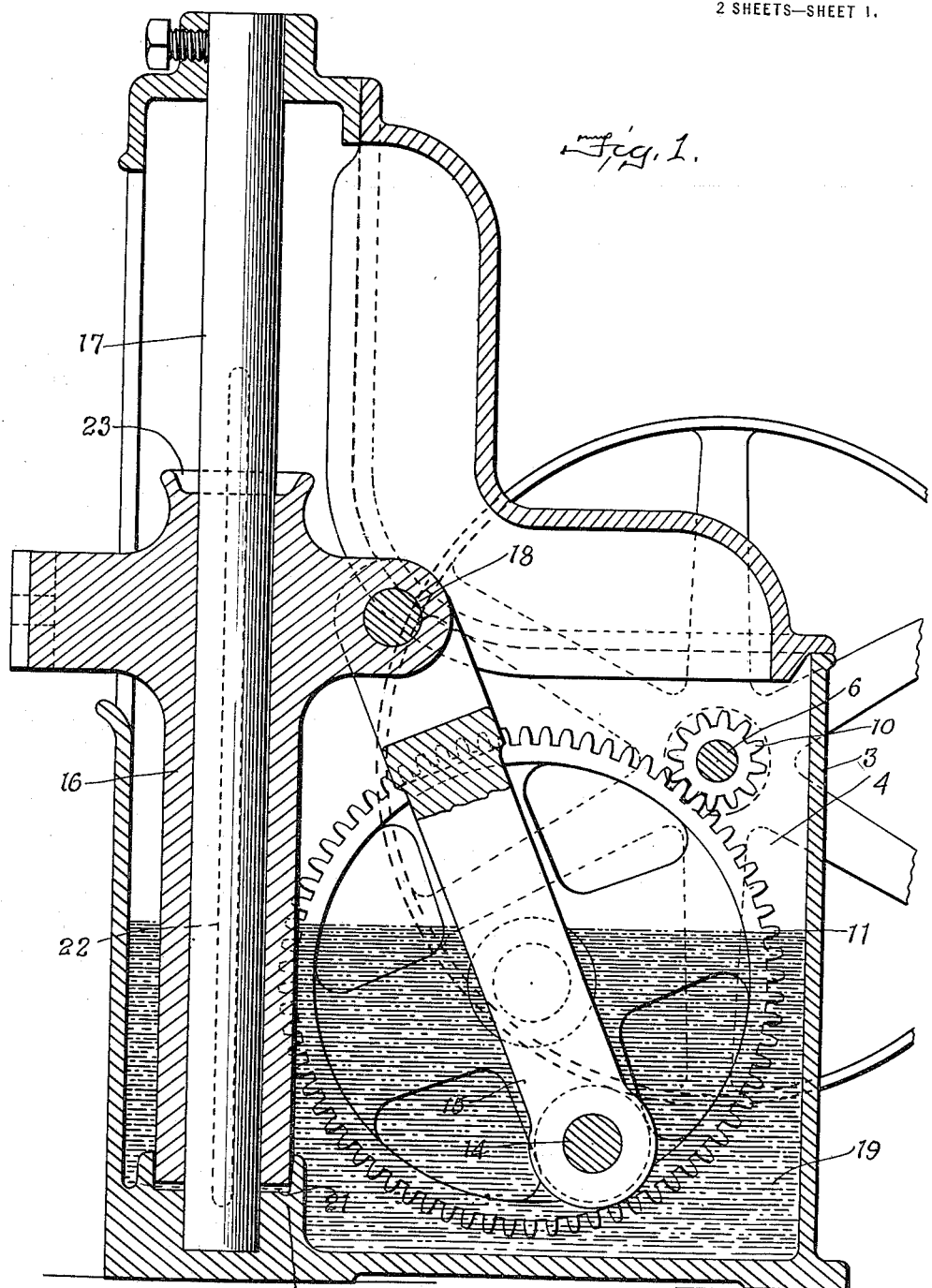

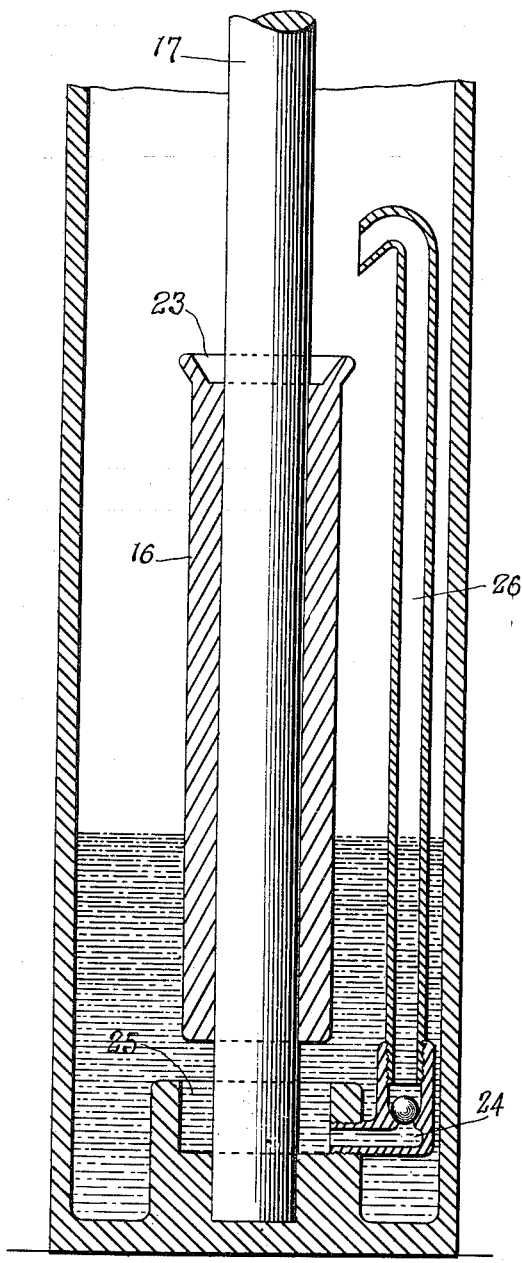

PHILIP A. MYERS, OF ASHLAND, OHIO, ASSIGNOR TO F. E. MYERS AND BROTHER, OF ASHLAND, OHIO, A COPARTNERSHIP CONSISTING OF FRANCIS E. MYERS AND PHILIP A. MYERS.

POWER-HEAD.

1,385,142.  Specification of Letters Patent.  Patented July 19, 1921.

Application filed January 16, 1920. Serial No. 351,967.

*To all whom it may concern:*

Be it known that I, PHILIP A. MYERS, a citizen of the United States, residing at Ashland, in the county of Ashland and State of Ohio, have invented certain new and useful Improvements in Power-Heads, of which the following is a specification, reference being had therein to the accompanying drawing.

This invention relates to power heads and has for its particular object to provide a power head having improved means for self-oiling that will be positive and constant in supplying oil to all parts of the mechanism requiring lubrication, the invention being a further development of the construction shown in my copending application, for Letters Patent Serial Number 337,644 filed November 13, 1919.

The effective oiling of the power head mechanism as contemplated and provided for in the invention effects material economies of operation, less power being required due to the minimized friction, the wear of the mechanism being materially reduced as a result of the effective lubrication thereof.

In the accompanying drawings:

Figure 1 is a vertical sectional view taken on the longitudinal center line of the power head and showing one form of the improved oiling system;

Fig. 2 is a detail sectional view showing a modified form of construction.

As shown in the drawings, the power head consists of a suitable casing 3, which is cast integrally, having an aperture 4 provided therein whereby accessibility to the mechanism within the casing is afforded, the opening being of suitable dimensions to permit the largest piece of the mechanism to readily pass therethrough.

A drive shaft 6 is supported in suitable bearings in the casing 3 and extends transversely of the machine, having secured to a projecting end thereof a suitable belt pulley whereby the power head may be operated from any suitable source of power.

Within the gear casing the shaft 6 has secured thereto two opposite driving pinions 10, meshing with two opposite crank gears 11, the gears 11 being mounted in any suitable manner in the casing 3; the gears being joined together by a shaft 14. Thus the gears move in unison, the connecting shaft serving as a wrist for the pitman 15 which connects the gears 11 to an operative sleeve 16, which is telescopically mounted and has reciprocating movement on a guide shaft 17, the pitman being connected to the sleeve by a suitable bearing 18. The guide shaft extends vertically through the gear casing and has its ends supported in the walls thereof.

From the foregoing description of the crank shaft casing and mechanism it will be apparent that the pitman 15 will be free to operate between the gears 11, having a direct driving relation with the operating sleeve; thus forming a correct crank construction, there being no overhang and the thrust being direct on the gears. By this arrangement also the pitman on the upstroke may travel near the guide shaft, thus giving a direct lift against the load of the liquid that is being pumped. A further advantage is obtained by connecting the pitman to the sleeve on one side of the guide shaft and the pump piston to the sleeve on the other side of the guide shaft. Thus binding action of the sleeve on the shaft will be prevented and power will be transmitted therethrough with the minimum of friction.

The provision for self-oiling of the mechanism of the power head consists of an oil reservoir or sump 19 formed in the lower portion of the gear casing 3, a considerable portion of the crank gears 11 being submerged in oil when the oil is at normal level in the casing. Thus the bearings of the gears 11 and the wrist bearing 14 will be directly lubricated by contacting with the oil, and the pinions 10 and their bearings will be lubricated by oil carried or splashed upwardly by rotation by gears 11.

To lubricate the sleeve 16 and guide shaft 17 a housing 20 having an oil well 21 formed therein is provided in the lower portion of the gear casing, surrounding the end of the guide shaft and being in longitudinal alinement with the sleeve 16. The top of the well being below the oil level in the casing, it is obvious that it will be constantly filled with oil. The lower end of the sleeve 16 projects into the oil well upon each down stroke of the pitman with the result that oil is carried and forced upwardly along the guide shaft and between the shaft and sleeve to effect lubrication thereof. To facilitate the upward movement of the oil either the shaft or the sleeve 16 or both may be grooved, as here shown at 22, and the upper end of the sleeve is provided with an oil cup 23. Thus the oil will be forced upwardly through the groove into the cup 23 and overflowing the cup, will also effectually lubricate the pitman and sleeve bearing 18.

In Fig. 2 modification of the oiling system for the guide shaft and driving sleeve are shown. In the form shown in Fig. 2, a valve 24 communicates with the oil in the well 25 and a tube 26 is connected to the valve to conduct the oil to the cup 23. Thus upon each down stroke of the pitman the end of the sleeve 16 will be projected into the oil well 25 and oil will be forced past the valve and discharged through the tube into the well 23; the system in other respects being substantially the same as that shown in Fig. 1.

From the foregoing detailed description it will be apparent that oil from the sump 19 will be constantly carried upwardly in the operation of the power head to lubricate the pinion 10 and the bearings of the shaft 6, the stud shafts 12 being submerged in oil when the oil in the sump is at normal level; also that lubrication of the sleeve 16, guide shaft 17 and the bearing connections 18 between the sleeve and the pitman 15 will be constantly effected by the oil being forced upwardly between the shaft and sleeve, or by means of tubes 26 or 29, to the overflow cup 23, the oil then moving by gravity to the bearing 18, and excess oil flowing back into the sump.

While the several self-oiling devices here shown are of preferred construction for the type of power head shown, it will be understood that suitable modifications of both the power head and self-oiling apparatus may be made without departing from the principles of the invention as illustrated in the drawings and defined in the appended claims.

Having thus fully described my invention, what I claim as new and desire to secure by Letters Patent, is:—

1. In a power head, the combination, with a gear casing and actuating mechanism mounted therein, of a guide shaft, a reciprocating member connected to said actuating member and coöperating with said guide shaft, an oil conductor externally of the reciprocating member and an oil well coöperating with said conductor and the reciprocating member, whereby oil will be forced through the conductor to lubricate the guide shaft.

2. In a power head, the combination, with a gear casing and actuating mechanism mounted therein, of a guide shaft, a sleeve connected to said actuating mechanism and having reciprocating movement on said shaft, an oil cup in one end of said sleeve, and an oil well adapted to be entered by the opposite end of said sleeve and means whereby oil from said well will be forced into the oil cup and the overflow of oil from the cup will lubricate said connections.

3. In a power head, the combination, with a power head casing having an oil sump therein, of mechanism having operable movement in said oil, whereby parts of said mechanism are lubricated, and comprising a guide shaft and a reciprocating member operable relative to the guide shaft and having an oil cup adapted to overflow with oil to lubricate other parts of said mechanism, and means coöperating with said member whereby oil from said sump is forced into said cup.

4. In a power head, the combination with a gear casing adapted to contain oil, of a guide shaft and a reciprocating member operable relative thereto, an oil conductor coöperating with said member externally thereof and communicating with the oil in said casing, whereby oil is conducted from the casing to said guide shaft and reciprocating members.

5. In a power head, the combination with a gear casing adapted to contain oil, a guide shaft and a reciprocating member operable relative thereto and having an oil cup therein, an oil conductor coöperating with said member externally thereof and communicating with the oil in said casing, whereby oil is conducted from the casing to said cup and the overflow of oil from the cup will act to lubricate portions of the power head mechanism.

6. In a power head, the combination, with a gear casing adapted to contain oil, whereby part of the mechanism of the power head will be lubricated by oil carried upwardly by said mechanism contacting with the oil in the casing, an oil well in the casing and a guide shaft supported relative to said well, and a member operable on the guide, having an overflow oil cup above the oil level in said casing and means coöperating with said member and oil well to force oil upwardly from the well into the overflow oil cup, whereby to lubricate other parts of the power head mechanism.

7. In a power head, the combination, with a gear casing, adapted to contain oil, whereby part of the mechanism of the power head will be lubricated by oil carried upwardly by said mechanism operable in said oil, mechanism having operable connections above the oil level in said casing, comprising an oil cup, and means coöperating with said mechanism, whereby oil from the well will be forced upwardly to said cup and the overflow of oil from the cup will lubricate said connections.

8. In a power head, a casing adapted to contain a quantity of lubricant, and having a well therein, and operating mechanism mounted in the casing and more or less immersed in the lubricant, said mechanism including a member adapted to deliver oil from said well, and an oil passage adapted to receive the oil so delivered and distribute it to the bearing of said member.

9. In a power head, a casing having an oil-well therein, and operable mechanism including a moving member whose bearing is to be lubricated, said member being adapted to deliver oil from said well, and an oil passage exterior to said bearing and adapted to receive oil so delivered and distribute it to said bearing.

10. In a power head, the combination, with a gear casing and actuating mechanism mounted therein, of a guide shaft, a slide connected to said actuating mechanism and having reciprocating movement on the guide shaft, and an oil well adapted to be entered by an end of said slide, whereby oil will be forced to the slide and said guide shaft.

11. In a power head, the combination, with a gear casing and actuating mechanism mounted therein, of a guide shaft, and a reciprocating member operable on the guide shaft and connected to said actuating mechanism, an oil supply in said casing adapted to be entered by the reciprocating member whereby oil will be forced between said member and the guide shaft.

12. In a power head, the combination, with a gear casing and actuating mechanism mounted therein, of a guide shaft and a reciprocating member operable on the guide shaft and connected to said actuating mechanism, an oil passage between the guide and said member, and an oil supply in said casing adapted to be entered by the reciprocating member whereby oil will be forced through said passage to lubricate the guide shaft and the reciprocating member.

13. In a power head, the combination, with a gear casing and actuating mechanism mounted therein, of a guide shaft, and a sleeve operably mounted thereon and connected to said actuating mechanism, an oil cup in said sleeve and an oil passage leading thereto between the shaft and sleeve, an oil well in said casing adapted to be entered by said sleeve, whereby oil from said well will be forced through the passage into said oil cup to lubricate parts of said mechanism.

In testimony whereof, I affix my signature.

PHILIP A. MYERS.